S. Stucky.

Steam Boiler.

No. 3,305. Reissued Feb. 16, 1869.

Witnesses:

A. A. Yeatman

Cornelius Cox

Inventor:

Stephen Stucky

Per

Alexander F. Mason

Atty

United States Patent Office.

STEPHEN STUCKY, OF NEW ALBANY, INDIANA.

*Letters Patent No.* 80,516, *dated July* 28, 1868; *reissue No.* 3,305, *dated February* 16, 1869.

IMPROVEMENT IN FEED-WATER HEATERS FOR BOILERS.

The Schedule referred to in these Letters Patent and making part of the same.

*To all whom it may concern:*

Be it known that I, STEPHEN STUCKY, of New Albany, in the county of Floyd, and in the State of Indiana, have invented certain new and useful Improvements in Steam-Boilers; and do hereby declare that the following is a full, clear, and exact description thereof, reference being had to the accompanying drawings, and to the letters of reference marked thereon.

The nature of my invention consists in the use of a shell-reservoir or drum, of suitable construction, for separating from the feed-water of a steam-generator any foreign or sedimentary matter which may be held in chemical solution, or mechanical suspension, and depositing such matter where it may be readily removed without serious delay or expense, and where its presence, if not removed immediately, will not cause serious derangement or danger to the generator to which it may be attached.

In order to enable others skilled in the art to which my invention appertains, to make and use the same, I will proceed to describe the manner in which it is or may be constructed, and its operation, referring to the annexed drawing, which forms a part of this specification, and in which—

Figure 1:
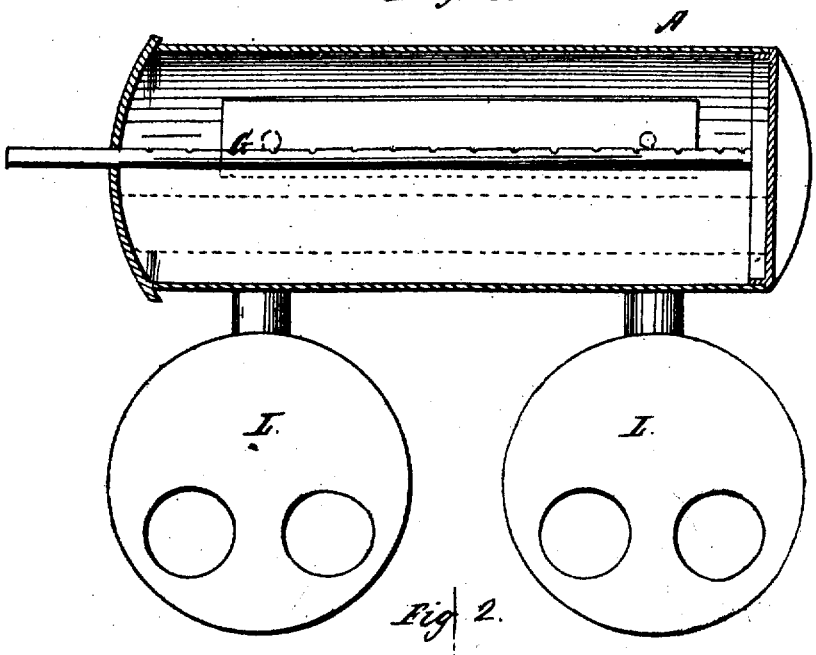
Figure 1 is a longitudinal vertical section.
Figure 2:
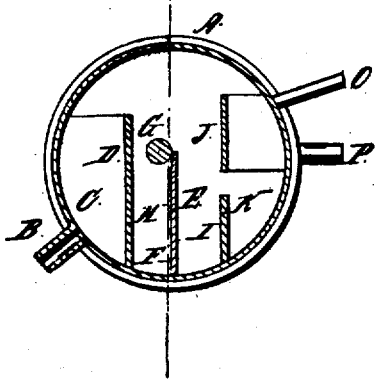
Figure 2 is a vertical cross-section.

My invention consists of a drum or reservoir, A, placed above or at the water-line or level of the boiler or generator to which it is to be attached, and made of any suitable material or shape to withstand the pressure at which steam is to be carried in the boiler, and may be provided with a series of partitions or divisions, which form several chambers, for retarding the flow of water, and receiving and retaining such matter as may be precipitated from the water.

In the drawings—

A represents the drum or reservoir, and

L L represent the boilers or generators to which it is attached.

The water is received into this drum through the pipe B, passes into chamber C, and, filling it, flows over the partition or side, D, of said chamber, and into chamber H, all the while being subject to the action of steam, which is received into the drum, from the boilers, through the pipe O.

The water, after filling the chamber H, flows over the perforated surface blow-off pipe G and partition F into chamber E; thence it flows, between the partitions J and I, into chamber K; and thence it passes out, through pipes P P, to the boiler.

During its tortuous course through the drum, and being subjected to the action of steam, the water is freed of a great deal of matter which is held in solution by it, said matter being precipitated to the bottom of the several chambers, or settling upon the surface.

The surface-matter is blown off through the pipe G, while that which is precipitated, is blown off through suitable pipes, which lead from the bottoms of the chambers for that purpose.

The above is illustrative of only one of the many ways in which the drum A may be arranged.

The interior arrangement may be varied considerably. For instance, I may use an inside reservoir, having a perforated top, and admit the water into said inside reservoir through a tortuous or winding pipe.

The steam, acting on the water, precipitates all the sediment in the bottom of the inner reservoir, while the purified water flows through pipes, from the outside reservoir, to the boiler or boilers.

I do not confine myself to any particular way of constructing the interior of the drum or reservoir.

Having thus fully described my invention,

What I claim as new, and desire to secure by Letters Patent, is—

A shell-reservoir or drum, of any suitable construction, provided with inlet, outlet, and refuse-matter pipes, when placed above or at the water-line of the boiler or boilers, to operate substantially as set forth.

In testimony that I claim the foregoing, I have hereunto set my hand, this 1st day of January, 1869.

STEPHEN STUCKY.

Witnesses:

THEO. VANDOREN,

J. M. MASON.